United States Patent [19]

Tinet et al.

[11] 4,068,259
[45] Jan. 10, 1978

[54] CODER AND DECODER FOR A SYSTEM DESIGNED TO DISSEMINATE COLOR TELEVISION AUDIO VIDEO SIGNALS

[75] Inventors: Claude Tinet; Jean Paul Peltier; Pierre Oprandi; René Romeas, all of Paris, France

[73] Assignee: Thomson-Brandt, Paris, France

[21] Appl. No.: 578,314

[22] Filed: May 16, 1975

[30] Foreign Application Priority Data

May 21, 1974 France .................. 74.17591

[51] Int. Cl.² .......................... H04N 5/76; H04N 9/32
[52] U.S. Cl. .......................................... 358/13; 358/4; 358/7
[58] Field of Search ............... 358/4, 8, 9, 12, 11, 358/13–15; 360/19, 23, 30, 29; 178/DIG. 23, 5.6, 5.8

[56] References Cited

U.S. PATENT DOCUMENTS

| | | | |
|---|---|---|---|
| 3,440,339 | 4/1969 | Johnson | 358/4 |
| 3,730,983 | 5/1973 | Numakura et al. | 358/4 |
| 3,825,674 | 7/1974 | Justice | 178/5.6 |
| 3,869,706 | 3/1975 | Peltier | 178/DIG. 23 |
| 3,916,092 | 10/1975 | Justice | 358/12 |
| 3,982,272 | 9/1976 | Veritoeven et al. | 358/4 |

*Primary Examiner*—John C. Martin
*Attorney, Agent, or Firm*—Cushman, Darby & Cushman

[57] ABSTRACT

A coder designed to receive color television audio video signals where a carrier wave is frequency modulated by the luminance signal and a sub-carrier wave is modulated by time multiplexed chrominance signal and audio signal; the carrier and the sub-carrier waves are linearly mixed and the resultant signal is converted into a multiplex wave formed by a train of length modulated pulses; the sub-carrier frequency is higher than the highest frequency of the luminance signal and the lowest instantaneous frequency of the carrier minus the highest frequency of the luminance signal is at least equal to the sub-carrier frequency; the multiplex signal may be transmitted and registered on a data carrier; and a decoder adapted for cooperating with the coder, for decoding the multiplex signal coming from the transmission channel or the read out data carrier and delivering the audio video signals.

10 Claims, 7 Drawing Figures

CODER AND DECODER FOR A SYSTEM DESIGNED TO DISSEMINATE COLOR TELEVISION AUDIO VIDEO SIGNALS

The present invention relates to systems designed to disseminate audio-video colour television signals, that is to say not only to transmit them over a distance through an electrical transmission channel, but also to record and reproduce these signals using, as a vehicle for that purpose, a data carrier such as a record disc or tape.

Whichever of these techniques of dissemination is used, it is important to encode the available signals so that they can be transferred or recorded in the form of an electrical signal which can be applied to a single pair of terminals. The coding operation is followed by the reverse operation, that of decoding, which is indispensable in order that, after reconstitution, the audio-video signals can be processed in the usual manner. The operations are performed by coding and decoding circuits which play a vital part in any information dissemination system.

Colour television audio-video signals normally comprise a luminance video signal containing recurrent synchronizing pulses, a chrominance video signal and at least one low frequency signal which carries the sound associated with the colour image. In practice, in sequential colour television signals, the chrominance signal is made up of alternate sections, the simultaneous processing of which is rendered possible by means of a delay line associated with a switch operating at the line scan frequency. The audio signal can be sampled at the line scan frequency and incorporated into the chrominance signal by a time-division multiplex circuit. Thus, it is possible to reduce to two the number of signals which require coding. One of these two signals, the complete luminance signal, occupies a frequency band of some few megahertz and the other, the chrominance-audio multiplex signal, occupies a substantially narrower frequency band.

The electrical signal resulting from the coding of the two above-mentioned signals, will advantageously take the form of a train of length modulated pulses and the shortest periodicity of these pulses will be as far as possible below 100 nanoseconds in order to make it possible to readily transcribe and read out the coded electrical signal utilising known of magnetic or optical data carriers.

The technique of coding by length modulation of a train of pulses has already been conceived in a form which consists in the frequency modulation of a carrier wave by means of the luminance signal, and in using this carrier wave to sample a sub-carrier modulated by the chrominance-audio signal. In this fashion, a pulse train is obtained, the edges of which displace along the time axis in accordance with the modulations introduced by the two control signals. During the decoding phase, the train of length modulated pulses is applied to a frequency discriminator which reconstitutes the luminance signal, and simultaneously to a band-pass filter which isolates the subcarrier and applies it to a demodulator reconstituting the chrominance-audio signal.

In order to facilitate recording and reading out of information coded by this technique, the frequencies of the sub-carrier and carrier have hitherto been chosen as low as possible and made relatively close to one another, this being translated in the reconstituted television image, by clearly visible defects.

To overcome these drawbacks, the invention proposes that the choice of frequencies should be made such that the defects pass unnoticed even should recording and reading out of the information deviate from optimum operating conditions. This choice does not introduce an excessive increase in the range of frequencies required for the recording or transmission of the pulse coded signal.

The object of the present invention is a coder having a multiple input provided for receiving colour television audio-video signals formed by a luminance video signal, a chrominance video signal of the sequential kind comprising horizontal blanking intervals and an audio signal accompanying said video signals, said coder comprising:

time multiplexing means for delivering a modulation signal formed by said chrominance signal and by samples of said accompanying audio signal inserted in the chrominance signal during horizontal blanking intervals, a first generator having a modulation input for receiving said modulation signal and an output for delivering a subcarrier wave, having a frequency at least equal to the upper limiting frequency of the band occupied by said luminance signal, modulated by said modulation signal, a second generator having a modulation input for receiving said luminance signal and an output for delivering a carrier wave having an instantaneous frequency which is higher than the frequency of said sub-carrier, frequency modulated by said luminance signal, a linear mixer with two inputs respectively connected to the outputs of said first and second generators and an output, and a triggered wave form generator having an input connected to the output of said linear mixer which triggers the output signal of said linear for producing a multiplex wave in the form of a train of pulses length modulated.

The invention likewise takes as its object, the decoder which is designed to reconstitute the audio-video signals from the multiplex wave generated by the coder, the system linking the coder with the decoder and the coding/decoding technique utilised in this method of dissemination of colour television audio-video signals.

The invention will be better understood from a consideration of the ensuing description and the attached figures in which.

Figure 1:
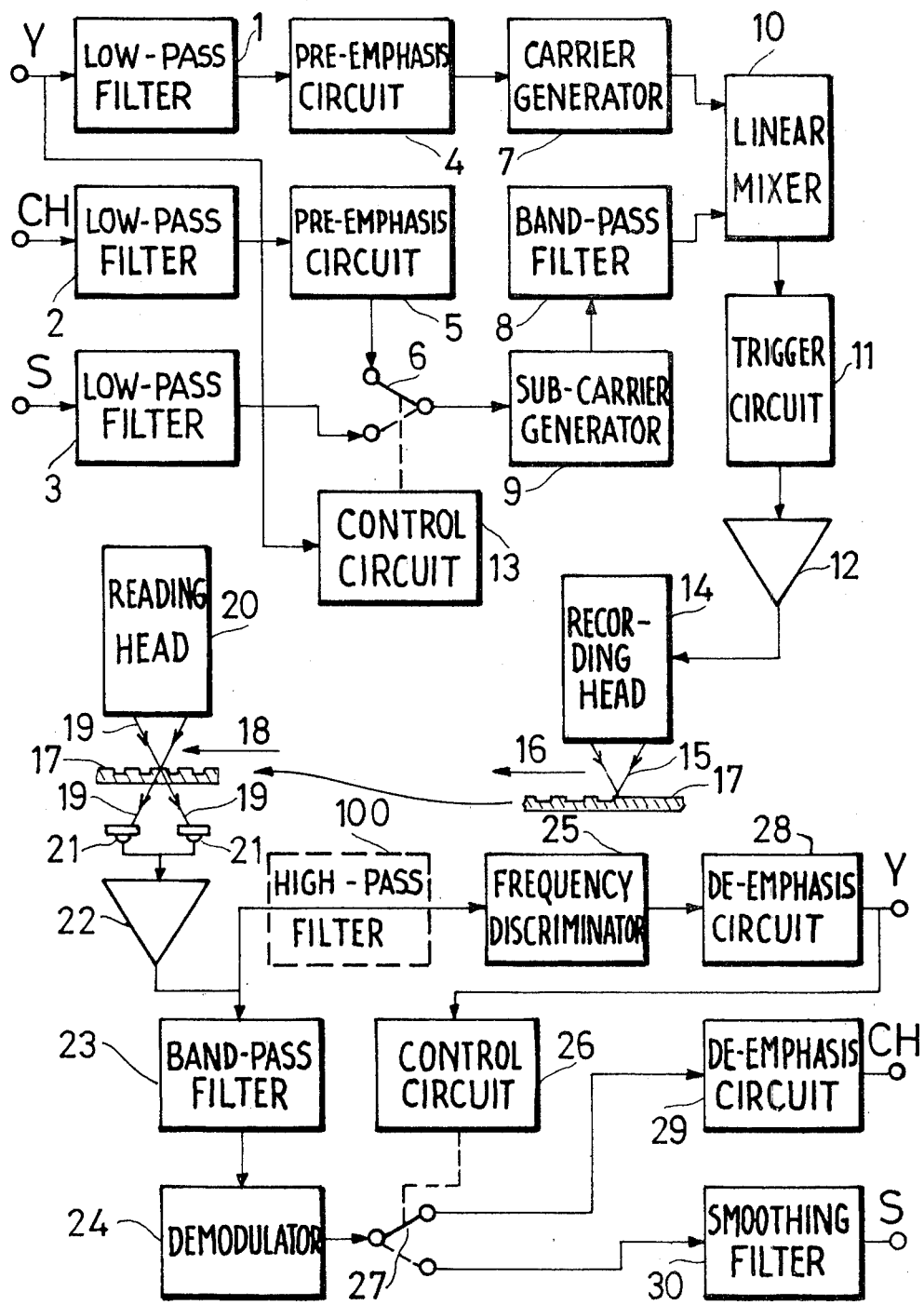
FIG. 1 illustrates the block diagram of a colour television audio-video signal dissemination system.

In FIG. 1, the block diagram of a system for the dissemination of colour television audio-video signals has been illustrated. The case in which the information to be transferred is stored on an optically readable data carrier, has been assumed here. The data carrier, by way of non-limitative example, may be constituted by a disc 17 upon one of the faces of which the information has been transcribed in the form of an impression. The impression may exhibit in relief a succession of peaks and troughs aligned in the form of a spiral track. This kind of relief, by its formation as a succession of diffractive elements of non-uniform length and spacing, produces a multiplex wave with two amplitude levels, which is made up of pulses length-modulated by the audio-video signals which are to be disseminated. Self-evidently, the invention, which is concerned with the coding and decoding of audio-video signals, is equally applicable to the case where transcription on to a magnetic data carrier is involved, and likewise to the case where, in the absence of any data carrier, a transmission channel is used in order to disseminate the audio-video signals.

The audio-video signals to be disseminated comprise a luminance video signal Y incorporating recurrent synchronizing pulses, a chrominance video signal CH in which sections representing the usual components R − Y and B − Y, alternate at the line scan frequency, and a low frequency signal S which is the audio signal accompanying the video signals.

In the top part of the diagram of FIG. 1, the elements illustrated form a coder whose output supplies, via an amplifier 12, a recording head 14 which transcribes the coded information by means of a recording beam 15. The coded information is stored on the data carrier 17 which performs a translatory motion 16 during the recording phase.

The system comprises the low-pass filters 1, 2 and 3 which respectively limit the frequency bands of the audio-video signals Y, CH and S. The band occupied by the luminance signal Y has a top limit given by the frequency $Y_M$, equal for example to 2.7 MHz; the band occupied by the chrominance signal CH has a top limit given by the frequency $CH_M$, equal for example to 0.5 MHz; the band occupied by the accompanying audio signal, has a limit given by the frequency $S_M$, which must not exceed half the line scan frequency, that is to say 8 KHz in the case of a 625 lines television standard. The filtered signals Y and CH are then respectively applied to pre-emphasis circuits 4 and 5 whilst the filter signal S is applied to one of the two input channels of a switch 6 operated at the line scan frequency by a control circuit 13. The circuit 13 is synchronized by the recurrent synchronizing pulses contained in the Y signal so that the output of the switch 6 is alternately connected to the filter 3 and to the pre-emphasis circuit 5. At the output of the switch 6, a chrominance-audio signal made up of the chrominance signal CH, and of samples of the signals S inserted in said chrominance signal during horizontal blanking intervals, is obtained. The chrominance-audio signal modulates a subcarrier wave of frequency $f_2$ furnished by a generator 9, whilst the luminance signal Y coming from the pre-emphasis circuit 4 frequency-modulates a carrier wave of frequency $f_1$ furnished by a generator 7. The carrier wave of frequency $f_1$ and the subcarrier wave of frequency $f_2$, transmitted by a band-pass filter 8, are superimposed in a linear mixer 10 in order to produce a resultant voltage:

$$S_A(t) = a_1 \sin 2\pi f_1 t + a_2 \sin 2\pi f_2 t$$

where $a_1$ and $a_2$ are constants, the ratio $k_2 = (a_2/a_1)$ being less than unity, the resultant voltages $S_1(t)$ then being applied to the input of a trigger circuit 11 which changes state when a given amplitude level is passed. The circuit 11 furnishes a train of length-modulated pulses the edges of which coincide with the instants at which said level is passed and this circuit may, by way of non-limitative example, be constituted by a Schmitt trigger stage or by an amplifier-limiter circuit.

The decoder system occupies the bottom part of FIG. 1. The read-out signal is obtained by illuminating the data carrier 17 through the agency of a reading head 20 which emits radiation 19 concentrated on the engraved surface of the data carrier. The radiation 19 is diffracted to a greater or lesser extent by the relief profile engraved in the data carrier 17 and is picked up selectively by photo-electric transducers 21. The voltage furnished by the transducers 21 and amplified by the amplifier 22 is applied to the decoder system. The latter comprises a band-pass filter 23 which serves to transmit the sub-carrier wave to a demodulator 24; it also comprises a frequency discriminator 25 connected to the output of the amplifier 22. At the output of the frequency discriminator 25 there is connected a de-emphasis circuit 28 which produces a luminance signal Y. The output of the demodulator 24 is connected to a switch 27 operated by a control circuit 26 which receives the recurrent synchronizing pulses of the reconstituted luminance signal Y. This switch is responsible for the time-division demultiplexing of the sections of the chrominance signal and of the samples of the accompanying audio signal. A de-emphasis circuit 29 connected to one of the outputs of the switch 27 furnishes the chrominance signal CH and a smoothing filter 30 connected to the other output of the switch 27 reconstitutes the accompanying audio signal S.

Figure 2:
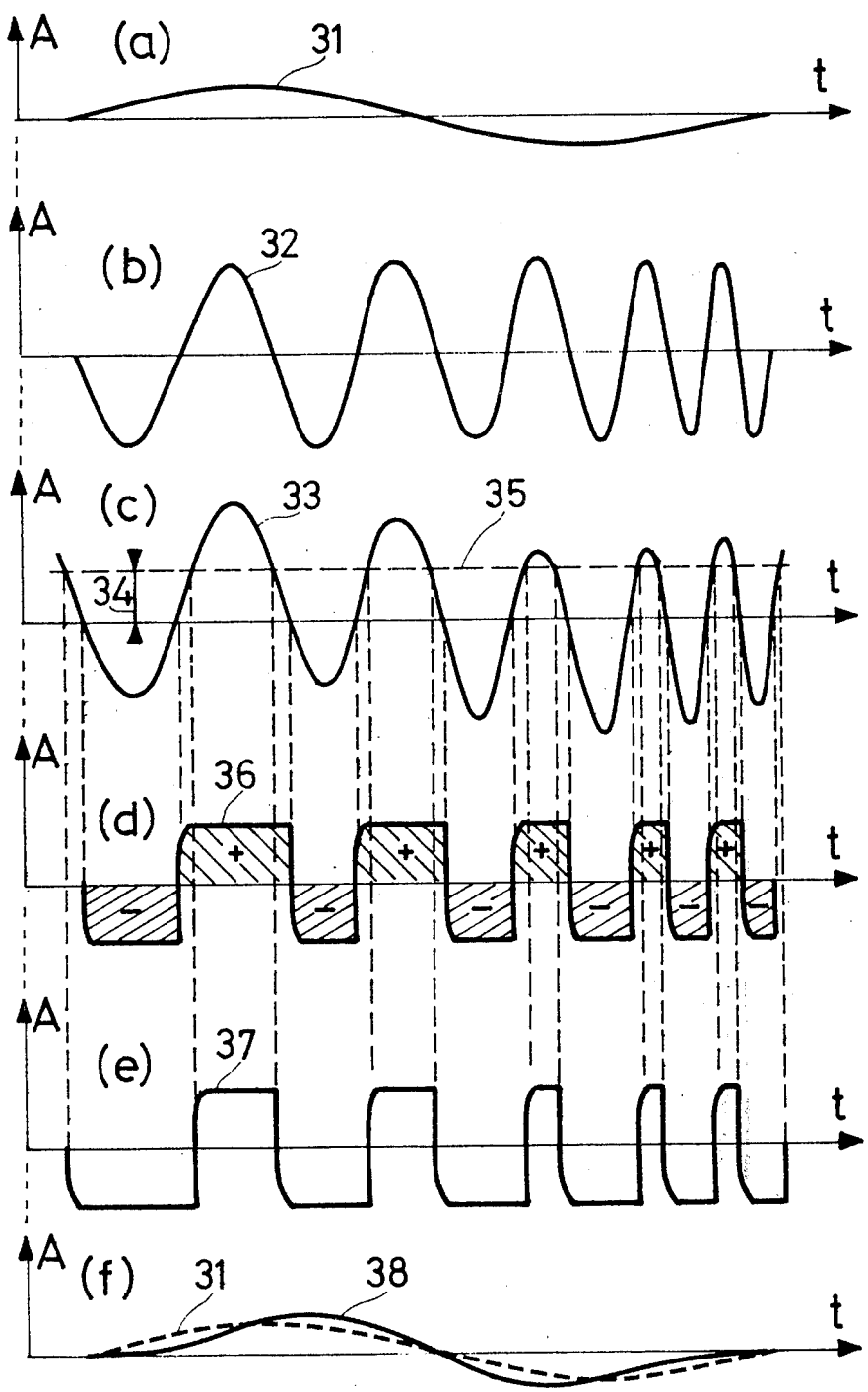
FIG. 2 is a diagram which explains the sampling technique used.

The diagram of FIG. 2 illustrates how the train of length-modulated pulses which constituted the multiplex wave coming from the coder, is formed. At (a) and (b), there have respectively been illustrated oscillograms of the subcarrier 31 and of the frequency-modulated carrier 32, the systems of axes comprising the amplitude A on the ordinates and the time t on the abscissa. At (c), the oscillogram 33 of the resultant voltage $S_A(t)$ has been shown. At (d), the multiplex wave 36 furnished by the sampling circuit 11 when the sampling level coincides with the time axis, has been shown. This level is the normal sampling level since it is symmetrically disposed in relation to the envelopes of the wave 33. It could happen that sampling takes place at a level 35 offset from the value 34, this giving rise to another multiplex wave 37 shown at (e) in FIG. 2. The offset 34 shown in the diagram (e) of FIG. 2 may result from a displacement of the sampling level fixed by the circuit 11, but it can also be explained by the presence of a parasitic direct component in the subcarrier or carrier waves. The deformation of the wave 36 under the effect of an offset 34 is similar to that which is produced by a malfunction in the devices responsible for recording and reading out the multiplexed wave.

Consequently, this offset is able to translate everything which might disturb the operation of the dissemination system. At (f), the sub-carrier component 38 obtained in the multiplex wave 36 has been shown, and this is obtained by locally effecting a comparison between the areas of the positive and negative cross-hatched zones of the diagram (d), from which it will be seen that said component differs little from the sub-carrier wave 31 prior to sampling. The frequency-modulated carrier can be directly recognised in diagrams (d) and (e). In order for the sampling to be such that the subcarrier is effectively transmitted, it will be seen that the carrier wave must not exhibit excessively steep rise portions.

Figure 3:
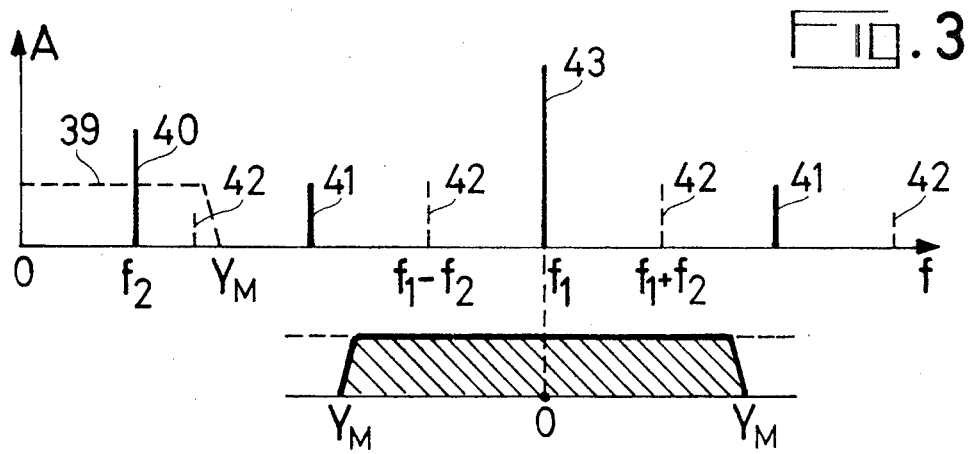
FIG. 3 illustrates an arrangement of the frequencies of the coded signal, which corresponds to a known method of coding.

The frequency spectrum of the multiplex wave 36 shown in FIG. 2, has been shown in FIG. 3 on the assumption that the sub-carrier frequency $f_2$ falls within the frequency band 39 of the luminance signal Y. This spectrum is made up of a line 40 at the frequency $f_2$, this being the sub-carrier frequency, a line 43 at the frequency $f_1$ of the carrier, odd lines 42 whose frequencies are $f_1 \pm k_1 f_2$, where $(k_1 = 1, 3, \ldots)$ and even lines 41 whose frequencies are $f_1 \pm k_2 f_2$, where $(k_2 = 2, 4, \ldots)$. However, it should be pointed out that the odd lines 42 shown in broken line, do not exist if sampling takes place symmetrically in accordance with the axis $t$ of the diagram (e) shown in FIG. 2. These odd lines 42 appear only if the sampling level of the diagram (e) of FIG. 2 ceases to coincide with the time axis. More generally, a mis-sampling effect occurs whenever, and for whatever reason, the graph 36 of FIG. 2 is modified to take the form shown by the graph 37.

In FIG. 3, centered on the line 43 there has been shown the bilateral frequency band occupied by the carrier wave frequency modulated by the luminance signal. It will be seen that the lines 42 occur within this frequency band and that when they do exist as a consequence of a mis-sampling effect, the frequency discriminator demodulates them in the form of a disturbance signal visible in the television image.

Figure 4:
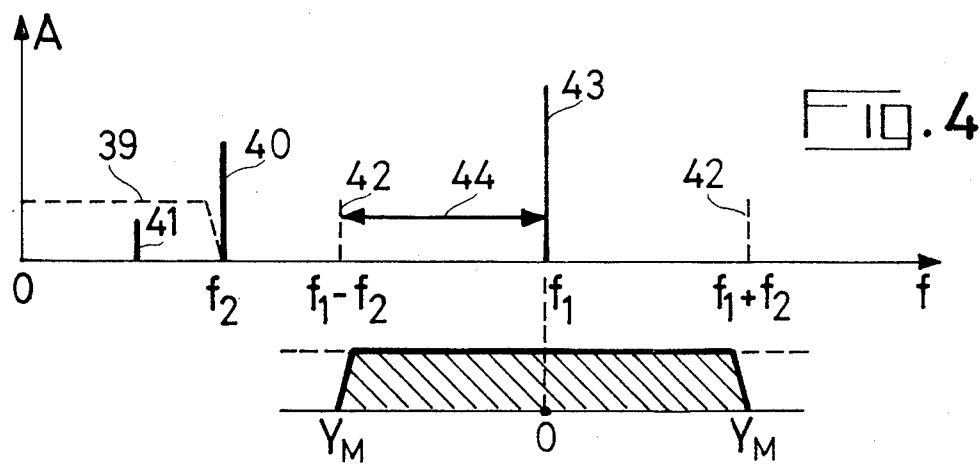
FIG. 4 illustrates an arrangement of the frequencies of the coded signal, as proposed in accordance with the present invention.

In FIG. 4, this drawback is avoided because the lines 42 are displaced to a distance 44 from the line 43, which is at least equal to the top limit $Y_M$ of the frequency band occupied by the signal Y. This arrangement comes down to the same thing as choosing the frequency $f_2$ of the sub-carrier equal to or greater than the highest frequency $Y_M$ contained in the luminance signal Y.

To sum up, if it is desired to avoid the appearance of visible disturbances in the image reconstituted from the multiplexed wave, then steps must be taken to satisfy the condition:

$$f_2 \geq Y_M$$

Thus, the mis-sampling effect, which consists of a modification of the form factor of the multiplex wave at whatever stage in the dissemination of the information, produces no visible repercussion which could disturb proper observation of the reconstituted image.

This condition can obviously be met by adopting a subcarrier frequency $f_2$ whose value is substantially higher than the top limit of the frequency band occupied by the luminance signal. However, there is no need to exaggerate matters in this direction, since the carrier wave must effect proper sampling of the sub-carrier and the multiplex wave, overall, should be located within a limited frequency band in view of the problems associated with recording and reading out.

Figure 5:
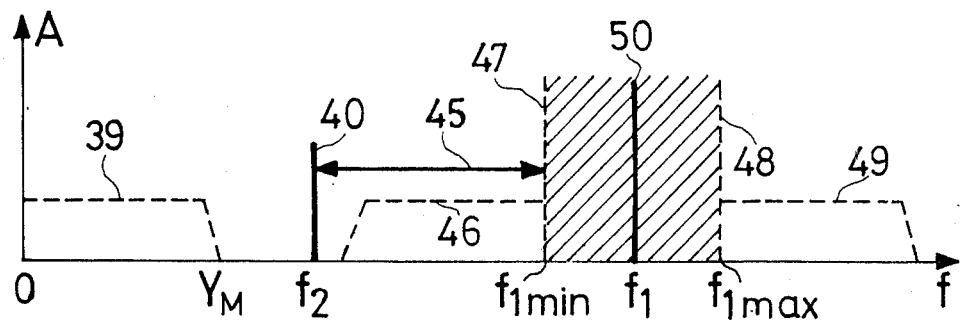
FIG. 5 illustrates another feature of the arrangement of the frequencies of the coded signal, as proposed in accordance with the invention.

In FIG. 5, a diagram of the frequency distribution of the signals has been illustrated, which satisfies the aforementioned condition and which shows to the right of the line 40 representing the sub-carrier, the frequency sweep range of the carrier. This cross-hatched range extends between the limits $f_{1min}$ and $f_{1max}$ referenced 47 and 48, these corresponding respectively to the lowest and highest instantaneous frequencies of the carrier wave. At either side of the frequency sweep range, there have been shown the side bands 46 and 49 which have the same profile as the frequency band 39 of the luminance signal Y. Experience has shown that any spectrum line occurring within the frequency range covered by the bands 46 and 49, including the crosshatched range, is detected in the form of a parasitic signal visible in the image. In particular, if the protection interval 45 separating the sub-carrier line 40 from the frequency $f_{1min}$ of the range swept by the carrier is below the limit $Y_M$, then in the reconstituted image unwanted cross-modulation effects will occur.

To solve this problem, it is necessary to impose a second condition upon the choice of frequencies, and this condition is expressed as follows:

$$|f_{1min} - f_2| \geq Y_M$$

One way of satisfying both the foregoing conditions whilst maintaining the multiplex wave within the narrowest possible frequency range, is to choose $f_2$ substantially equal to $Y_M$ and then to choose $f_{1min}$ substantially equal to twice $Y_M$. However, it should be pointed out here that if the two conditions are satisfied it is not absolutely necessary for the carrier frequency to be at least twice the sub-carrier frequency.

Figure 6:
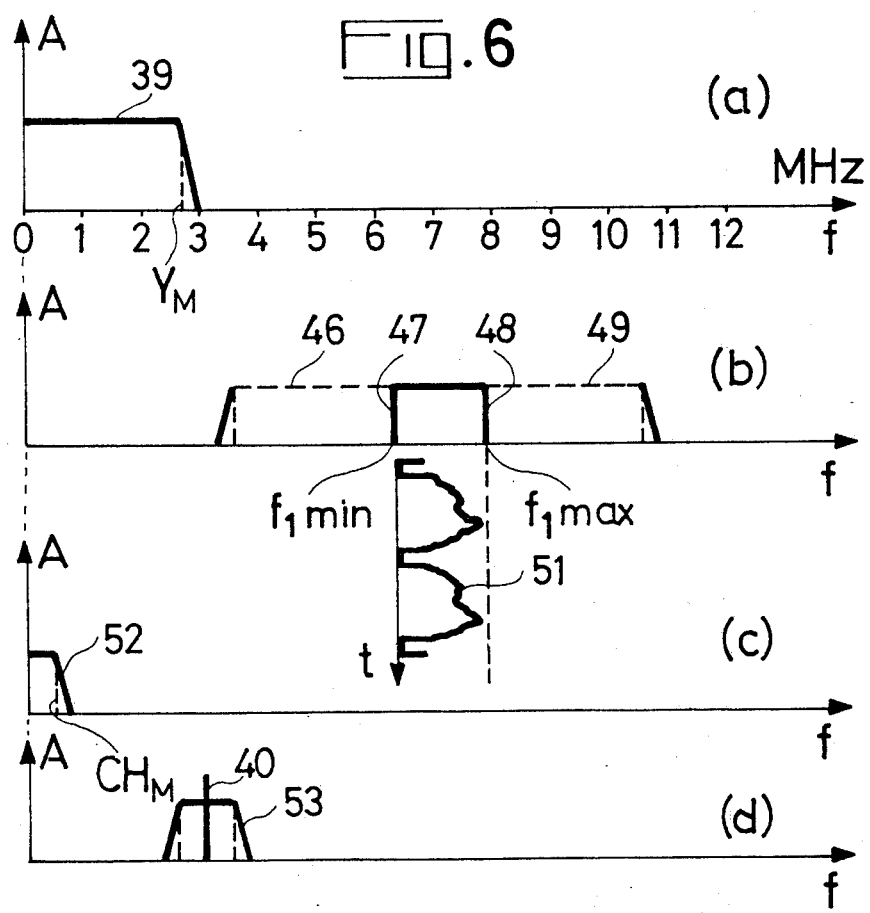
FIG. 6 is a diagram which explains a particular embodiment of the invention.

In FIG. 6, by way of non-limitative example a choice of frequencies in accordance with the invention has been made.

At (a), in FIG. 6, there has been illustrated the frequency profile of the luminance signal, limited by the top frequency $Y_M = 2.7$ MHz.

At (b) the carrier frequency, frequency-modulated within a range extending from $f_{1min} = 6.3$MHz to $f_{1max} = 7.8$MHz, has been shown. In this diagram, on the time axis the modulation law has been illustrated, that is to say the luminance signal 51 with its recurrent synchronizing pulses located at the low frequency end. The side bands 46 and 49 which are essential for demodulation, have also been shown.

At (c), the frequency profile 52 of the chrominance-audio signal has been shown, this extending up to the top limiting frequency $CH_M = 500$ KHz. The audio signal is assumed to have been multiplexed with the chrominance signal by means of samples introduced at the line scan frequency of 15.625 KHz, and the low frequency band of the audio signal is limited to 8 KHz.

At (d), the frequency profile 53 of the spectrum of modulation of the sub-carrier by the chrominance-audio signal, has been shown. The central spectrum line 40 of the sub-carrier is equal to 3.0 MHz. It is possible here to adopt either amplitude modulation or angular modulation. In the chosen example, frequency-modulation with a frequency sweep of $\pm 400$ KHz has been opted for; following this hypothesis, the profile 53 is that of the band-pass filter 8 which, in FIG. 1, follows the sub-carrier generator 9. The ratio of the carrier and sub-carrier amplitudes is chosen close to $k_2 = 0.2$. This choice of frequencies makes it possible, through an optically readable disc-type data carrier, to disseminate colour television audio-video signals. The highest frequency to be recorded is $f_{1max} = 8$ MHz and at reading out, the processing of the signals can be carried out within a band of 11 MHz.

An improvement can be made to the decoding of the multiplex wave. In FIG. 1, we have seen that in order to detect the luminance signal, the multiplex wave read out and amplified by the amplifier 22 was applied directly to the input of the frequency discriminator 25.

Figure 7:
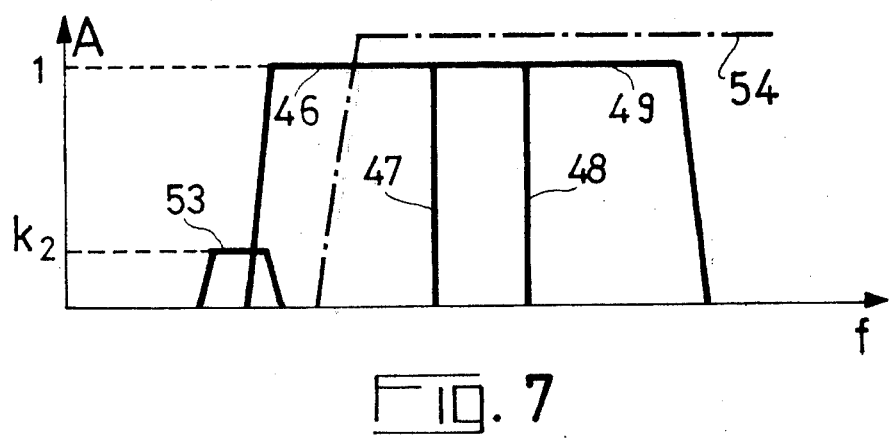
FIG. 7 is a diagram which explains a variant embodiment of the invention.

This solution is an acceptable one if the frequency spectrum of the sub-carrier is sufficiently well spaced from that of the carrier. However, FIG. 7, which illustrates a frequency selection in accordance with the invention, shows that the bottom of the side band 46 tends to overlap the spectrum 53 of the sub-carrier. The amplitude reduction of the latter in the ratio $k_2$, is not sufficient to prevent a disturbing signal, visible in the image, from being detected by the carrier wave frequency discriminator.

To overcome this drawback, the invention provides for the insertion of a high pass filter 100 between the amplifier 22 and the discriminator 25. In FIG. 1, this filter 100 has been shown in broken line, and in FIG. 7 its filtering band 54 has been shown in chair-dotted fashion.

What we claim is:

1. A Coder having a multiple input provided for receiving colour television audio-video signals formed by a luminance video signal, a chrominance video signal of the sequential kind comprising horizontal blanking intervals and an audio signal accompanying said video signals, said coder comprising:

time multiplexing means for delivering a modulation signal formed by said chrominance signal and by samples of said accompanying audio signal inserted in said chrominance signal during said horizontal blanking intervals;
   a first generator having a modulation input for receiving said modulation signal and an output for delivering a sub-carrier wave modulated by said modulation signal, said sub-carrier wave having a fixed frequency at least equal to the upper limiting frequency of the band occupied by said luminance signal;
   a second generator having a modulation input for receiving said luminance signal and an output for delivering a carrier wave frequency modulated by said luminance signal, said carrier wave having an instantaneous frequency higher than the frequency of said subcarrier;
   a linear mixed with two inputs respectively connected to the outputs of said first and second generators and an output;
   and a triggered wave form generator having an input connected to the output of said linear mixer which triggers the output signal of said linear mixer producing multiplex wave in the form of a train of pulses length modulated.

2. A coder as claimed in claim 1, wherein the lowest frequency in the range swept by said carrier wave is at least equal to the sum of said sub-carrier frequency and the upper limiting frequency of the band occupied by said luminance signal.

3. A coder as claimed in claim 2, wherein the frequency of said sub-carrier wave is equal to said upper limiting frequency.

4. A coder as claimed in claim 3 wherein the difference between the lowest frequency of the range swept by said carrier wave and the frequency of said sub-carrier wave is equal to said upper limiting frequency.

5. A coder as claimed in claim 4, wherein said first generator is an amplitude modulated generator.

6. A coder as claimed in claim 4, wherein said first generator is an angular modulated generator.

7. A decoder adapted for cooperating with a coder as claimed in claim 1 for decoding said multiplex wave, having an input for receiving said multiplex wave, said decoder comprising:

a band pass filter having an input coupled to the input of said decoder and an output, for isolating said sub-carrier wave;
   demodulating means having an input coupled to the output of said band pass filter and an output, in order to reconstitute, by demodulation thereof, said modulation signal;
   time division demultiplexing means having an input connected to the output of said demodulating means and two outputs, for separating said chrominance video signal and said accompanying audio signal;
   and frequency discriminator means having an input coupled to the input of said band pass filter and an output, for delivering said luminance signal.

8. A decoder as claimed in claim 7, wherein the input of said band pass filter is coupled to the input of said frequency discriminator means through a high-pass filter whose cut-off frequency is chosen at least equal to said sub-carrier frequency and sufficiently low in order to transmit that portion of the spectrum of said carrier wave which is required for the proper reconstitution of said luminance signal.

9. A system for the dissemination of colour television audio-video signals comprising a coder as claimed in claim 1 delivering said multiplex wave, a transmission channel for transmitting said multiplex wave, a recording device for recording said multiplex wave on a track carried by a data carrier.

10. A system as claimed in claim 9, further comprising a reading device for reading said multiplex wave recorded on said data carrier and a decoder adapted for cooperating with said coder for delivering said audio-video signals from said multiplex wave.

* * * * *